Jan. 19, 1932.   G. F. QUINBY   1,841,848
PRESSURE INDICATOR FOR PUMPS
Filed Sept. 24, 1928
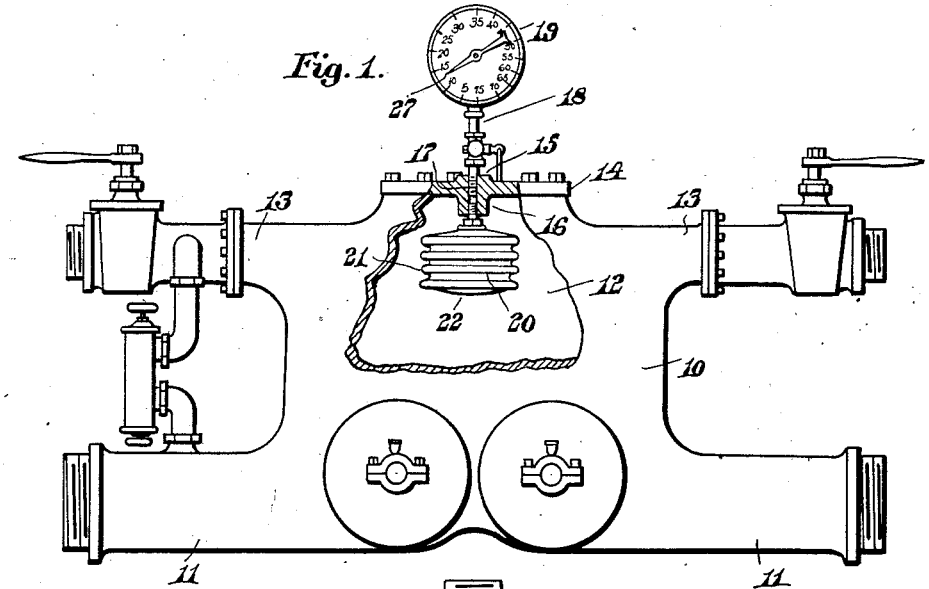
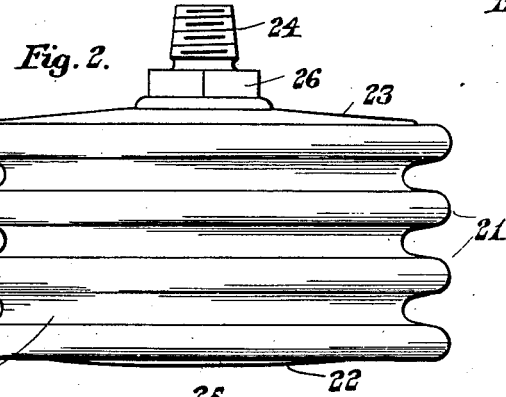
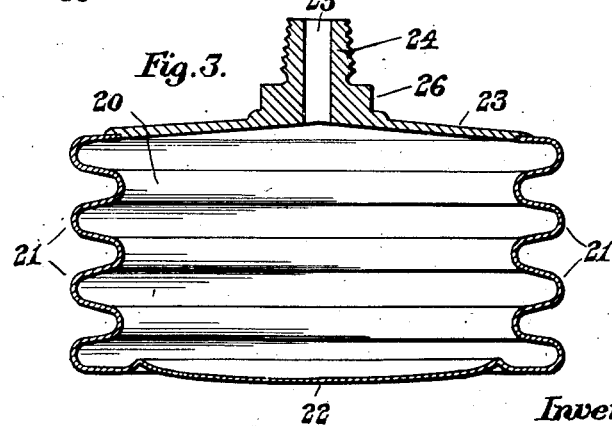
Inventor:
George F. Quinby,
by Walter E. Lombard,
Atty.

Patented Jan. 19, 1932

1,841,848

UNITED STATES PATENT OFFICE

GEORGE F. QUINBY, OF DORCHESTER, MASSACHUSETTS

PRESSURE INDICATOR FOR PUMPS

Application filed September 24, 1928. Serial No. 307,856.

This invention relates to pressure indicators for pumps and particularly for pumps on fire apparatus, the object of the invention being the production of a device of this character which will be sure to operate in all kinds of weather.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claim.

Of the drawings:

Figure 1 represents an elevation of a pump with a portion broken away to show applied thereto an attachment embodying the principles of the present invention.

Figure 2 represents an elevation of the pressure indicator attachment, and

Figure 3 represents a vertical section of said attachment.

Similar characters indicate like parts throughout the several figures of the drawings.

In the drawings, 10 is the casing of a pump such as is in common use on motor-driven fire apparatus.

This pump has inlets 11, 11 to the chamber 12 and outlets 13, 13 from said chamber.

The pump itself forms no part of the present invention and therefore requires no detailed description.

The chamber 12 is closed by a cover plate 14 having oppositely disposed bosses 15, 16 extending therefrom through which an opening 17 extends.

A pipe 18 is threaded at one end to the boss 15 and mounted on the outer end of this pipe 18 is a pressure indicator 19 of usual construction.

Heretofore, the water being pumped through the chamber 12 has passed through the pipe 18 into the indicator 19 on which the correct pressure within the chamber 12 is indicated in the usual manner.

Such a construction will work satisfactorily in mild weather but it has been found in practice that in freezing weather the water in the pipe 18 will freeze, cutting off all communication with the indicator 19 and thus making it impossible to determine the pressure of the water in chamber 12.

Under such conditions the indicator 19 is practically worthless.

The present invention is designed to overcome this objection and provide means whereby the pressure in chamber 12 may be accurately indicated in all kinds of weather.

This desired result is accomplished by providing a closed compressible receptacle 20 which is placed within the chamber 12 in communication with the pipe 18, and which receptacle is filled with some non-freezing material either in the form of gas or liquid.

For instance, this material may be compressed air, alcohol, glycerine, oil, or any other similar material which will not freeze.

The receptacle is made of thin spring metal with a plurality of annular corrugations 21 in the side wall thereof and with its bottom wall 22 cup-shaped as indicated in Fig. 3.

The upper wall 23 of the receptacle is provided with a threaded extension 24 adapted to be screwed into the boss 16 so that the passage 25 through the wall 23 will be alined with the bore of pipe 18.

One part of the wall 23 is flat sided as indicated at 26 providing means whereby the receptacle 20 may be turned when the extension 24 is being threaded to the boss 16.

The indicator 19 is likewise filled with the same non-freezing material and this is also true of pipe 18 and opening 25.

Consequently any upward movement of the bottom 22 will so act upon the material within said receptacle 20 as to move it upwardly into the indicator 19 and cause the hand 27 thereof to move and indicate the pressure.

Owing to the side wall of receptacle 20 being of spring metal and corrugated, it is readily collapsed under pressure and the spring of the metal will return the bottom wall 22 to its normal position when the pressure is reduced.

As no part of the water being pumped can enter the interior of the indicator 19 and the pipe 18 leading thereto, all material in said pipe and indicator being of a character which will not freeze, it is self-evident that the indicator will be operable even in the most severe weather and the pressure within the chamber 12 may be determined at all times.

This makes a very simple and inexpensive means for effectively overcoming all objections found in operating pressure indicators attached to the pumps of fire apparatus.

While the device is designed particularly for use in connection with fire engine pumps, it is self-evident that it may also be used to advantage in connection with other pumps subjected to freezing weather.

Whenever it is necessary to draw water from a river or reservoir a vacuum must be created in the chamber 12 before any water can be drawn into said chamber.

Under such conditions the receptacle will expand and cause the degree of vacuum within the chamber 12 to be shown on the indicator 19.

It is obvious, therefore, that the indicator 19 may be used either as a pressure gage under certain conditions and as a vacuum gage under certain other conditions.

It is believed that the operation and many advantages of the invention will be understood without further description.

Having thus described my invention, I claim:

In an attachment for a pressure-chamber having an opening therein, the combination of a closure plate provided with holes in its marginal part to receive threaded fasteners for securing it over said opening, said plate having an internally threaded opening through its middle part, a pressure-gage at one side of said plate and provided with a threaded tubular support screwed into said threaded opening, and an expansible and contractable chamber at the opposite side of said plate from said pressure-gage and having a hollow threaded extension screwed into said threaded opening, whereby said contractable chamber is in open communication with said pressure gage and adapted to force liquid thereinto for effecting its operation, the width of the said plate being considerably greater than the width of said pressure gage so as to have its securing means or threaded fasteners a distance from the margin of the first named opening while this opening is large enough to permit said contractable chamber to be passed therethrough, substantially as shown.

Signed by me at 746 Old South Bldg., Boston, Massachusetts, this 21st day of September, 1928.

GEORGE F. QUINBY.